(12) United States Patent
Trout et al.

(10) Patent No.: US 10,851,939 B2
(45) Date of Patent: Dec. 1, 2020

(54) RESTRICTOR FOR A DYNAMIC FAN MOUNT

(71) Applicant: DELTA T, LLC, Lexington, KY (US)

(72) Inventors: Chris Trout, Lexington, KY (US);
Ethan Beum, Lexington, KY (US);
Preston Goulson, Lexington, KY (US)

(73) Assignee: DELTA T, LLC, Lexington, KY (US)

( * ) Notice: Subject to any disclaimer, the term of this patent is extended or adjusted under 35 U.S.C. 154(b) by 15 days.

(21) Appl. No.: 16/178,807

(22) Filed: Nov. 2, 2018

(65) Prior Publication Data

US 2020/0141537 A1 May 7, 2020

(51) Int. Cl.
| | | |
|---|---|---|
| F16M 13/00 | (2006.01) | |
| F16M 13/02 | (2006.01) | |
| F04D 29/64 | (2006.01) | |
| F04D 25/08 | (2006.01) | |

(52) U.S. Cl.
CPC ......... *F16M 13/027* (2013.01); *F04D 29/646* (2013.01); *F04D 25/088* (2013.01); *F05B 2240/9112* (2013.01)

(58) Field of Classification Search
CPC ............................ F16M 13/027; F04D 29/646
USPC ....... 248/610, 611, 612, 613, 343, 342, 344, 248/317; 416/500, 210 R, 204 R, 246, 416/244 R
See application file for complete search history.

(56) References Cited

U.S. PATENT DOCUMENTS

| | | | |
|---|---|---|---|
| 3,124,330 A | | 3/1964 | Robinson |
| 4,064,427 A | | 12/1977 | Hansen et al. |
| 4,238,819 A | | 12/1980 | Harris |
| 4,560,321 A | | 12/1985 | Kawai |
| 5,085,392 A | | 2/1992 | Pema |
| 5,711,397 A | | 1/1998 | Flora et al. |
| 5,984,640 A | * | 11/1999 | Wang .................... F04D 29/601 248/343 |
| 6,520,468 B2 | | 2/2003 | Lee et al. |
| 6,619,919 B2 | | 9/2003 | Kerr |
| 6,709,238 B2 | | 3/2004 | Marshall |
| 6,881,037 B2 | | 4/2005 | Marshall |
| 7,510,160 B1 | * | 3/2009 | Wang .................... F04D 25/088 248/288.31 |
| 7,527,232 B2 | | 5/2009 | Frampton et al. |
| 7,621,498 B2 | * | 11/2009 | Tang ....................... F04D 29/60 248/317 |
| 7,625,186 B1 | | 12/2009 | Lueddecke |
| 8,353,675 B2 | * | 1/2013 | Lin ....................... F04D 29/601 416/244 R |
| 8,480,041 B2 | | 7/2013 | Myers |
| 8,931,747 B2 | | 1/2015 | Davis |
| 10,590,960 B2 | | 3/2020 | Beaman et al. |
| 2003/0213883 A1 | | 11/2003 | Fu-Liang |

(Continued)

OTHER PUBLICATIONS

Office Action dated Sep. 25, 2020, in U.S. Appl. No. 16/555,782; Igor Davidenko.

*Primary Examiner* — Todd M Epps (74) *Attorney, Agent, or Firm* — King & Schickli, PLLC (57) ABSTRACT

A dynamic fan mount for supporting the fan has a first part movable relative to a second part. A restrictor for restricting lateral movement or swaying of the fan is provided. In one embodiment, the restrictor is a cushion connected to the second part of the dynamic fan mount for dampening the movement of the fan relative to the mount. Related methods are also disclosed.

17 Claims, 7 Drawing Sheets

(56) References Cited

U.S. PATENT DOCUMENTS

| | | |
|---|---|---|
| 2004/0195479 A1 | 10/2004 | Gulley |
| 2005/0006549 A1 | 1/2005 | Liu |
| 2005/0189456 A1 | 9/2005 | Hoffmann |
| 2006/0024127 A1 | 2/2006 | Heath |
| 2007/0090242 A1 | 4/2007 | Gulley |
| 2008/0107527 A1 | 5/2008 | Gajewski |
| 2008/0124224 A1* | 5/2008 | Tsai ................. F04D 29/601 416/244 R |
| 2009/0152426 A1 | 6/2009 | Longton et al. |

* cited by examiner

RESTRICTOR FOR A DYNAMIC FAN MOUNT

TECHNICAL FIELD

This document relates generally to the air circulating fan arts and, in particular, a dynamic fan mount with a restrictor.

BACKGROUND

A variety of fan systems have been made and used over the years in a variety of contexts. For instance, various ceiling fans are disclosed in U.S. Pat. No. 7,284,960, entitled "Fan Blades," issued Oct. 23, 2007; U.S. Pat. No. 6,244,821, entitled "Low Speed Cooling Fan," issued Jun. 12, 2001; U.S. Pat. No. 6,939,108, entitled "Cooling Fan with Reinforced Blade," issued Sep. 6, 2005; and U.S. Pat. No. D607,988, entitled "Ceiling Fan," issued Jan. 12, 2010. The disclosures of each of those U.S. patents are incorporated by reference herein. Additional exemplary fans are disclosed in U.S. Pat. No. 8,079,823, entitled "Fan Blades," issued Dec. 20, 2011; U.S. Pat. Pub. No. 2009/0208333, entitled "Ceiling Fan System with Brushless Motor," published Aug. 20, 2009; and U.S. Pat. Pub. No. 2010/0278637, entitled "Ceiling Fan with Variable Blade Pitch and Variable Speed Control," published Nov. 4, 2010, the disclosures of which are also incorporated by reference herein. It should be understood that teachings herein may be incorporated into any of the fans described in any of the above-referenced patents, publications, or patent applications.

A fan blade or airfoil may include one or more upper air fences and/or one or more lower air fences at any suitable position(s) along the length of the fan blade or airfoil. Merely exemplary air fences are described in U.S. Pat. Pub. No. 2011/0081246, entitled "Air Fence for Fan Blade," published Apr. 7, 2011, the disclosure of which is incorporated by reference herein. Alternatively, any other suitable type of component or feature may be positioned along the length of a fan blade or airfoil; or such components or features may simply be omitted.

The outer tip of a fan blade or airfoil may be finished by the addition of an aerodynamic tip or winglet. Merely exemplary winglets are described in U.S. Pat. No. 7,252,478, entitled "Fan Blade Modifications," issued Aug. 7, 2007, the disclosure of which is incorporated by reference herein. Additional winglets are described in U.S. Pat. No. 7,934,907, entitled "Cuffed Fan Blade Modifications," issued May 3, 2011, the disclosure of which is incorporated by reference herein. Still other exemplary winglets are described in U.S. Pat. No. D587,799, entitled "Winglet for a Fan Blade," issued Mar. 3, 2009, the disclosure of which is incorporated by reference herein. In some settings, such winglets may interrupt the outward flow of air at the tip of a fan blade, redirecting the flow to cause the air to pass over the fan blade in a perpendicular direction, and also ensuring that the entire air stream exits over the trailing edge of the fan blade and reducing tip vortex formation. In some settings, this may result in increased efficiency in operation in the region of the tip of the fan blade. In other variations, an angled extension may be added to a fan blade or airfoil, such as the angled airfoil extensions described in U.S. Pat. Pub. No. 2008/0213097, entitled "Angled Airfoil Extension for Fan Blade," published Sep. 4, 2008, and issued Apr. 24, 2012 as U.S. Pat. No. 8,162,613, the disclosure of which is incorporated by reference herein. Other suitable structures that may be associated with an outer tip of an airfoil or fan blade will be apparent to those of ordinary skill in the art. Alternatively, the outer tip of an airfoil or fan blade may be simply closed (e.g., with a cap or otherwise, etc.), or may lack any similar structure at all.

The interface of a fan blade and a fan hub may also be provided in a variety of ways. For instance, various interfaces are described in U.S. Pat. Pub. No. 2009/0081045, entitled "Aerodynamic Interface Component for Fan Blade," published Mar. 26, 2009 and issued Apr. 3, 2012 as U.S. Pat. No. 8,147,204; and U.S. Provisional Patent App. No. 61/590,469, entitled "Fan with Resilient Hub," filed Jan. 25, 2012, the disclosure of which is incorporated by reference herein. In addition, or in the alternative, the fan blade may include a retention system that couples the tip of a fan blade to an attachment point on the fan hub via a cable running through the fan blade, such as that disclosed in U.S. Pat. Pub. No. 2011/0262278, entitled "Fan Blade Retention System," published Oct. 27, 2011. Alternatively, the interface of a fan blade and a fan hub may include any other component or components, or may lack any similar structure at all.

It should also be understood that a fan may include sensors or other features that are used to control, at least in part, operation of a fan system. For instance, such fan systems are disclosed in U.S. Pat. Pub. No. 2009/0097975, entitled "Ceiling Fan with Concentric Stationary Tube and Power-Down Features," published Apr. 16, 2009, and issued Apr. 3, 2012 as U.S. Pat. No. 8,147,182, the disclosure of which is incorporated by reference herein; U.S. Pat. Pub. No. 2009/0162197, entitled "Automatic Control System and Method to Minimize Oscillation in Ceiling Fans," published Jun. 25, 2009, and issued Feb. 28, 2012 as U.S. Pat. No. 8,123,479, the disclosure of which is incorporated by reference herein; U.S. Pat. Pub. No. 2010/0291858, entitled "Automatic Control System for Ceiling Fan Based on Temperature Differentials," published Nov. 18, 2010, the disclosure of which is incorporated by reference herein; and U.S. Provisional Patent App. No. 61/165,582, entitled "Fan with Impact Avoidance System Using Infrared," filed Apr. 1, 2009, the disclosure of which is incorporated by reference herein. Alternatively, any other suitable control systems/features may be used in conjunction with embodiments described herein.

Fans may also include a variety of mounting structures. For instance, a fan mounting structure is disclosed in U.S. Pat. Pub. No. 2009/0072108, entitled "Ceiling Fan with Angled Mounting," published Mar. 19, 2009, and issued Apr. 10, 2012 as U.S. Pat. No. 8,152,453, the disclosure of which is incorporated herein. Of course, a fan need not be mounted to a ceiling or other overhead structure, and instead may be mounted to a wall or to the ground. For instance, a fan may be supported on the top of a post that extends upwardly from the ground. Still other mounting structures may be used in conjunction with the embodiments described herein.

While several systems and methods have been made and used for mounting ceiling fan blades, it is believed that no one prior to the inventors has made or used the invention described in the appended claims.

SUMMARY

According to a first aspect of the disclosure, an apparatus for mounting a fan includes a fan mount for supporting the fan. The fan mount comprises a first part movable relative to a second part. A restrictor is connected to the second part of the dynamic fan mount, such as above the first part, for restricting the movement of the fan relative to the fan mount.

In one embodiment, the first part comprises a partially spherical ball and the second part comprises a socket for at least partially receiving the partially spherical ball. The restrictor is positioned in the fan mount for engaging an upper surface of the partially spherical ball. The restrictor may include at least one projection for extending into a cavity within the partially spherical ball. The restrictor may comprise a compressible material, and may further include a passage for receiving a fastener for connecting the restrictor to the second part of the dynamic fan mount. The apparatus may also include a power source, and the restrictor may be provided with an opening for receiving wires from the power source.

A bracket may be provided for securing the restrictor to the fan mount. The bracket may be U-shaped and the restrictor adapted to fit within a cavity of the bracket. The bracket may include a passage for receiving a fastener for connecting the bracket to the dynamic fan mount.

According to a second aspect of the disclosure, an apparatus for mounting a fan includes a fan mount for supporting the fan. The fan mount comprises a socket for receiving an at least partially spherical ball. A cushion is connected to the fan mount for dampening the motion of the partially spherical ball relative to the socket.

In one embodiment, the cushion is mounted above and separate from the partially spherical ball. A bracket may be connected to the fan mount for at least partially receiving the cushion. A fastener may also be provided for connecting the bracket to the mounting assembly. The fastener may extend through a passage in the cushion.

This disclosure also pertains to a method of controlling sway of a fan relative to a fan mount comprising a first part connected to a support for supporting the fan, the first part being movable relative to a second part. The method comprises cushioning the movement of the first part relative to a third part connected to the second part. The cushioning step comprises connecting a cushion to the second part for engaging the first part. The method may further include the step of passing a fastener through the fan mount and the cushion.

BRIEF DESCRIPTION OF THE DRAWINGS

While the specification concludes with claims which particularly point out and distinctly claim this technology, it is believed this technology may be better understood from the following description of certain examples taken in conjunction with the accompanying drawings, in which like reference numerals identify the same elements and in which:

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

I. Exemplary Fan Overview

Figure 1:
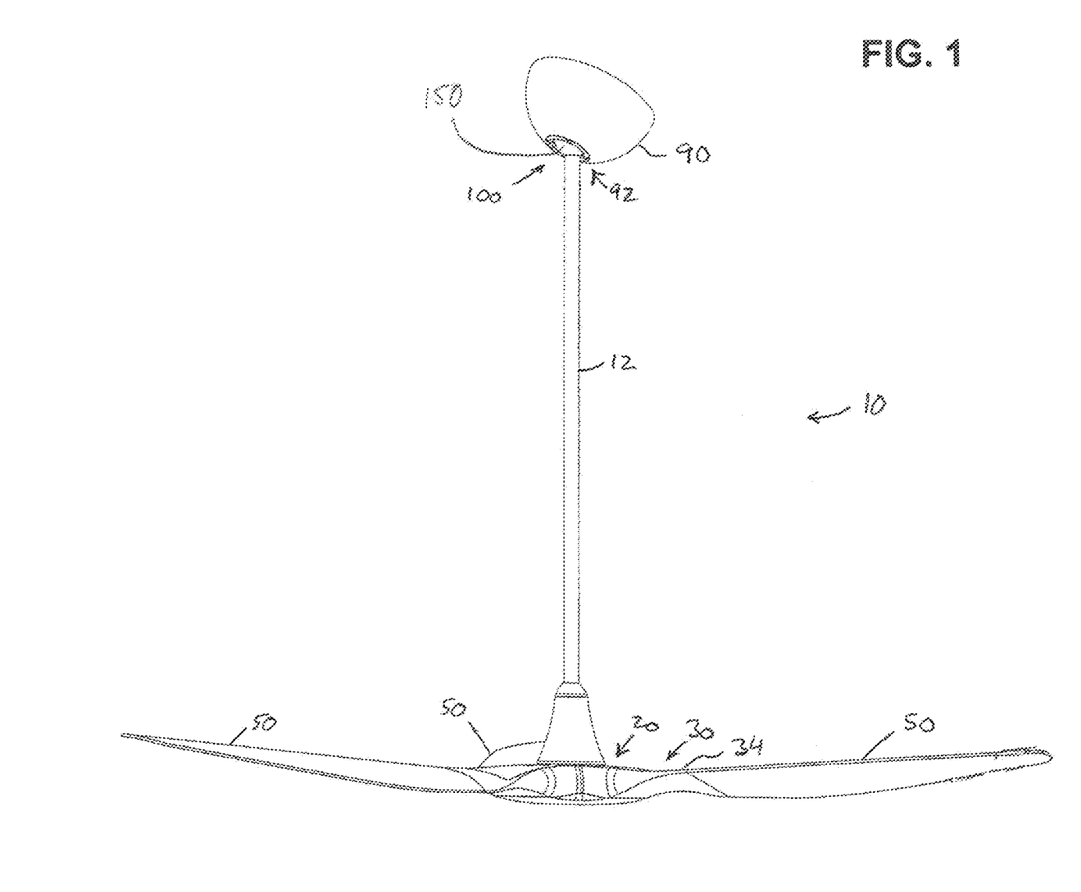
FIG. 1 depicts an exemplary fan mounted to a ceiling with an exemplary ball and socket mounting assembly.

FIG. 1 depicts an exemplary fan (10) having a motor assembly (20), a hub assembly (30) coupled to motor assembly (20), and a plurality of fan blades (50) coupled to hub assembly (30). In the present example, fan (10) (including hub assembly (30) and fan blades (50)) has a diameter of approximately 5 feet. In some versions, fan (10) has a diameter of approximately 7 feet. In other variations, fan (10) has a diameter between approximately 6 feet, inclusive, and approximately 24 feet, inclusive. Further still, fan (10) may have any other suitable dimensions, such as 3 feet, inclusive, to 30 feet, inclusive. Except as otherwise described herein, fan (10) may be constructed and operable in accordance with at least some of the teachings of any of the references that are cited herein; and/or in any other suitable fashion. By way of example only, motor assembly (20) may be constructed in accordance with at least some of the teachings of U.S. Pat. Pub. No. 2009/0208333, entitled "Ceiling Fan System with Brushless Motor," published Aug. 20, 2009, the disclosure of which is incorporated by reference herein. Furthermore, fan (10) may include control electronics that are configured in accordance with at least some of the teachings of U.S. Pat. Pub. No. 2010/0278637, entitled "Ceiling Fan with Variable Blade Pitch and Variable Speed Control," published Nov. 4, 2010, the disclosure of which is incorporated by reference herein. Alternatively, motor assembly (20) may have any other suitable components, configurations, functionalities, and operability, as will be apparent to those of ordinary skill in the art in view of the teachings herein.

In the present example, motor assembly (20) is coupled to a support (12) that is adapted to couple fan (10) to a ceiling or other support structure via ball and socket mounting assembly (100), as will be described in greater detail below. By way of example only, support (12) and/or ball and socket mounting assembly (100) may include features of or be constructed in accordance with at least some of the teachings of U.S. Pat. Pub. No. 2009/0072108, entitled "Ceiling Fan with Angled Mounting," published Mar. 19, 2009, and issued Apr. 10, 2012 as U.S. Pat. No. 8,152,453, the disclosure of which is incorporated by reference herein, and/or in any other suitable configuration. In some versions, motor assembly (20) may be remote from hub assembly (30) and may be coupled via an axle or other component that is operable to transmit rotational movement from motor assembly (20) to hub assembly (30). Still other configurations will be apparent to one of ordinary skill in the art in view of the teachings herein.

In the present example, a cover (90) substantially shrouds mounting assembly (100) such that only a portion of ball member (150), described in greater detail below, is exposed through cover (90). Cover (90) comprises a substantially hollow hemispherical cover with a central opening (92) to permit a portion of ball member (150) and support (12) to extend therethrough. In some versions, a seal may encircle opening (92) to substantially seal or otherwise limits the passage of material through any gaps between cover (90) and ball member (150). Such a seal may comprise a rubber (natural or synthetic), polymer, felt, or other material annular member that is positioned in or around opening (92). In addition, or in the alternative, the seal may comprise a plurality of fiber strands to form a brush-like ring about ball member (150). The seal may be coupled to cover (90) via a plurality of mechanical fasteners (e.g., screws, bolts, etc.), though this is merely optional. In some versions, the seal may be adhesively attached and/or inserted into a slot or other feature of cover (90) to retain the seal therein. In some versions the seal may be omitted entirely. Of course, still other configurations for cover (90) and/or seal (94) will be apparent to one of ordinary skill in the art in view of the teachings herein.

As demonstrated in the example shown in FIG. 1, ball and socket mounting assembly (100) permits support (12) and fan (10) to pivot about various axes that are perpendicular to the longitudinal axis defined by support (12) such that fan (10) may be mounted to an angled ceiling, such as a cathedral ceiling or other non-level ceiling. Accordingly, fan (10) can substantially self-level via the weight of fan (10) during installation. Support (12) can thus maintain a substantially vertical position when fan (10) is installed.

II. Exemplary Ball and Socket Mounting Assembly

In some versions, it may be preferable to have fan (10) rotate in substantially all planes of freedom while suspended from a mounting surface. Such rotation may be accomplished by rotating about a single point. By having a single rotation and attachment point, a decorative cover, such as cover (90), having a very small opening for support (12) may be used while encasing any wiring and electrical connections in an area where fan (10) is attached to a ceiling or other mounting surface. In some versions, it may be desirable to limit some of the motion about this single point. For example, in a case where fan (10) is imperfectly balanced or where a slight breeze may blow fan (10), fan (10) may sway or oscillate. In such situations, it may be desirable for the mounting assembly of fan (10) to provide a degree of frictional resistance or damping to resist these motions while still retaining the ability to rotate in substantially all planes of freedom while suspended from a mounting surface. Such friction may be provided via ball and socket assembly (100), described below, such that the friction substantially prevents subsequent, inadvertent deviations of support (12) and/or fan (10) from a substantially vertical orientation.

Figure 2:
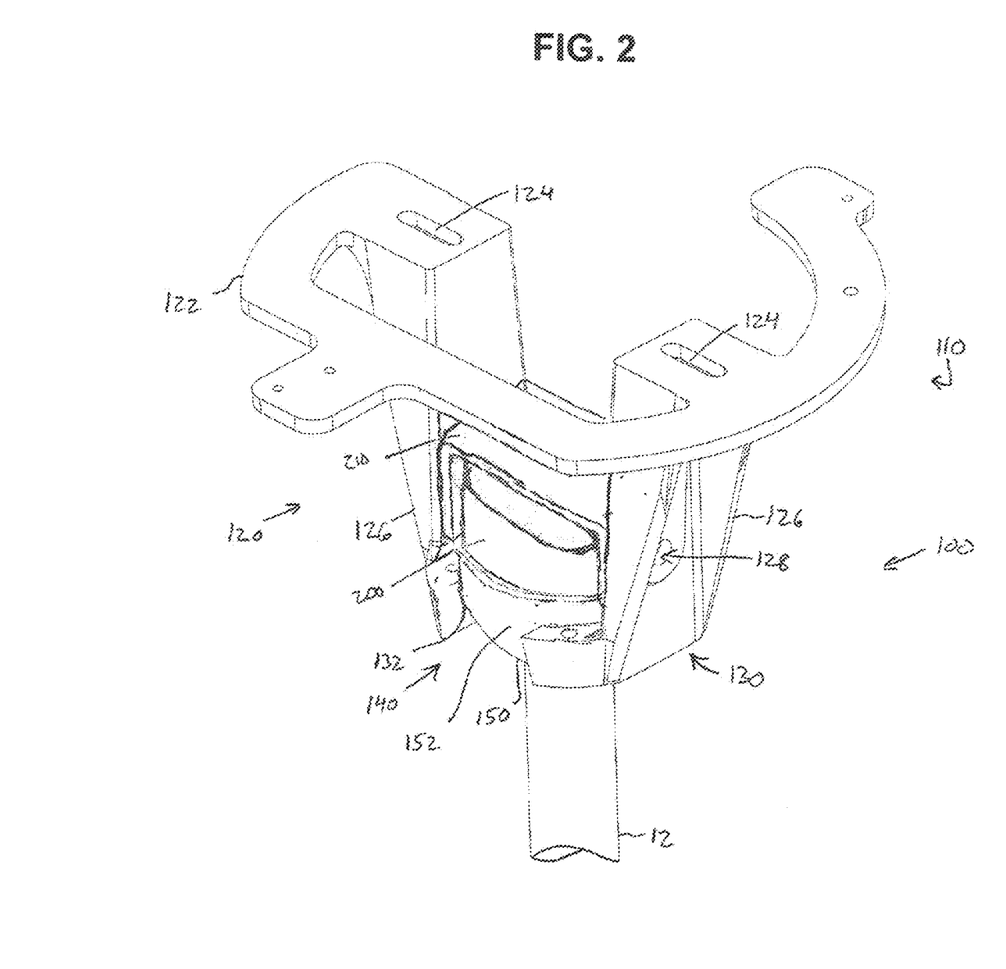
FIG. 2 depicts a perspective view of the restrictor used in conjunction with a ball and socket mounting assembly.
Figure 3:
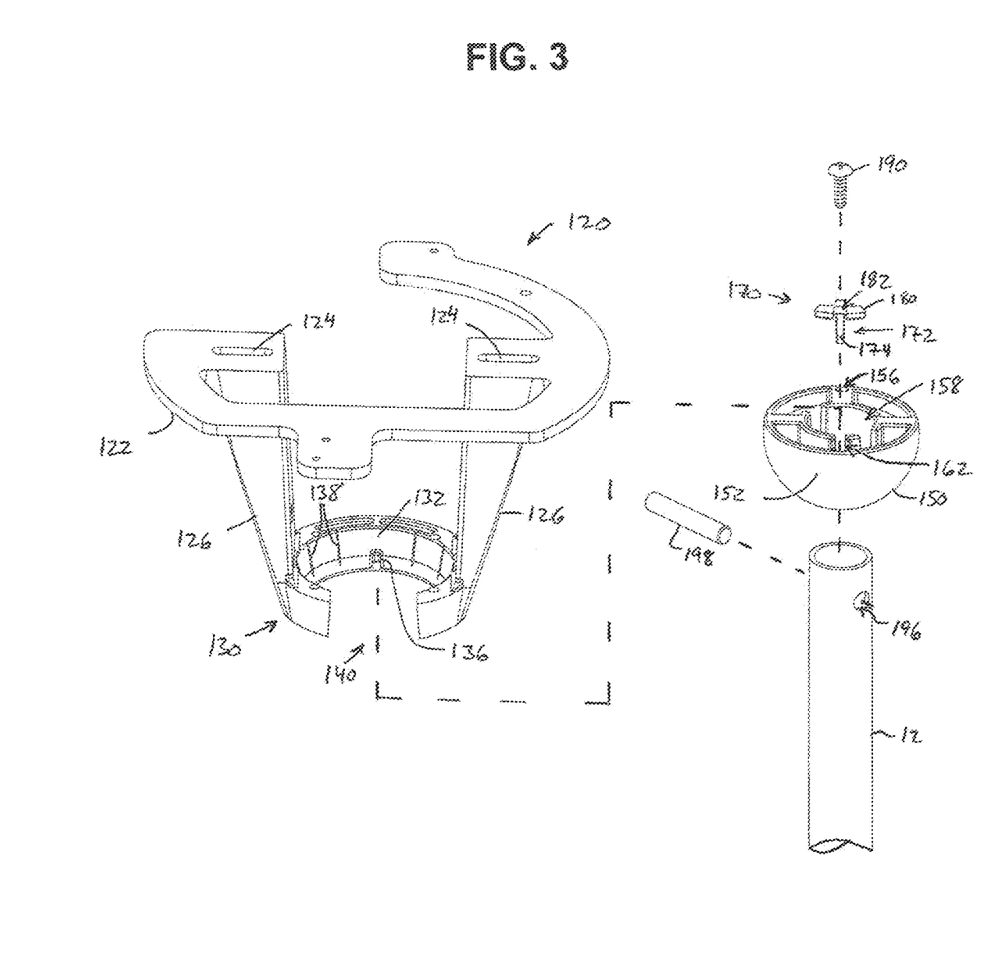
FIG. 3 depicts an exploded perspective view of the ball and socket mounting assembly of FIG. 2.
Figure 4:
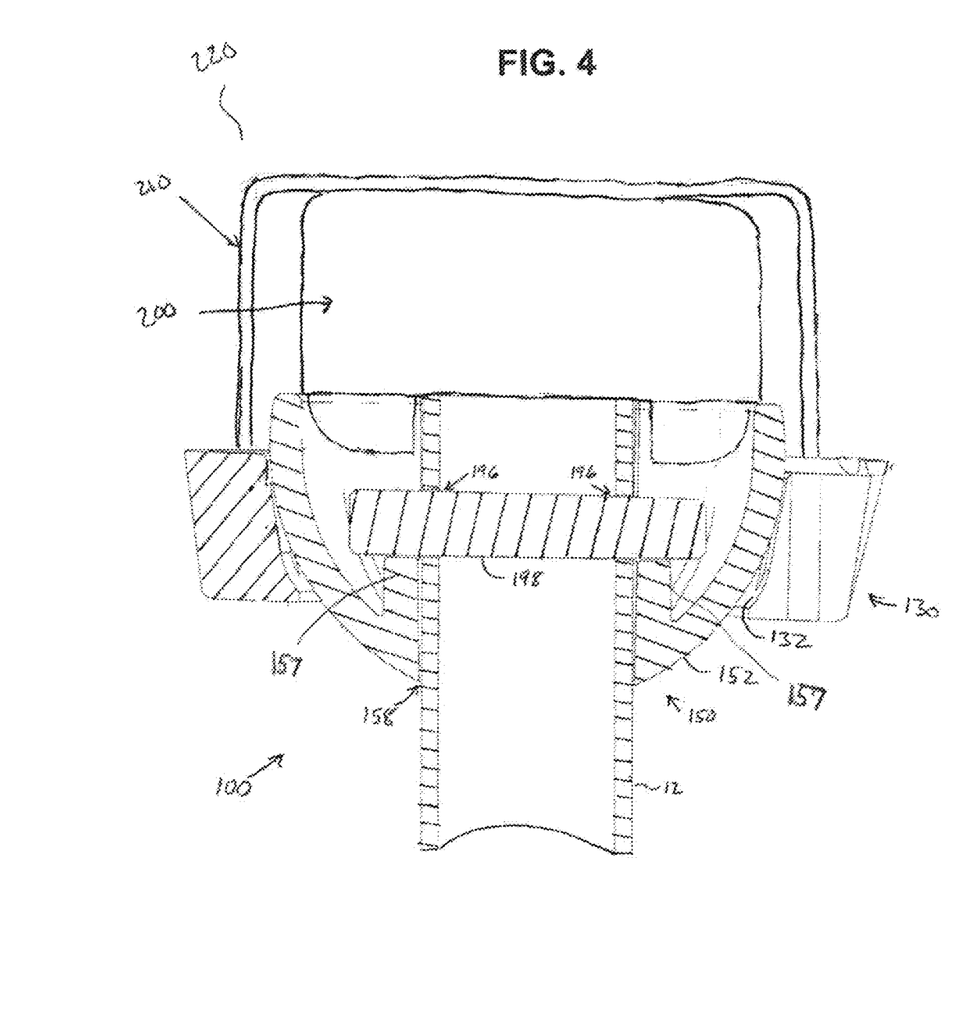
FIG. 4 depicts a partial cross-sectional view of the restrictor and ball and socket mounting assembly of FIG. 3 showing the interface of the restrictor with the socket.

FIGS. 2-4 depict an exemplary dynamic mounting assembly (100) that couples support (12) of fan (10) to a ceiling or other mounting surface. As shown in FIG. 2, the mounting assembly (100) comprises a mount (110) and a ball member (150) coupled to support (12). Mount (110) comprises a mounting portion (120) and a socket portion (130). In the present example, mount (110) comprises a unitary metallic member configured to support fan (10), though it should be understood that mount (110) may be divided into discrete parts and/or made of other materials (e.g., polymers, ceramics, etc.). Mounting portion (120) comprises a substantially flat member (122) having one or more openings (124) through which a fastener (e.g., a screw, bolt, etc.) may be inserted to couple mounting portion (120) to a ceiling or other mounting surface. In the present example, openings (124) comprise slots to permit adjustment of the location of mount (110) relative to the ceiling or other mounting surface, though this is merely optional.

Flat member (122) comprises a substantially C-shaped member, though this is merely optional. In some versions, flat member (122) may be a rectangular, circular, ovular, and/or other plate having any other geometry. In addition, or in the alternative, flat member (122) need not necessarily be flat, but may be curved or have other non-planar features. Such features may be used to conform to a non-flat mounting surface, such as a curved ceiling. Flat member (122) is offset from socket portion (130) by a pair of stanchions (126). Stanchions (126) comprise U-shaped channels that extend downwardly from flat member (122). In the present example, the upper portions of the U-shaped channels taper as stanchions (126) extend downwardly, but this is merely optional. Stanchions (126) each include a lateral opening (128) to which one or more additional components may be attached, though this is merely optional. In some versions, lateral openings (128) may receive a fastener (F) (see FIG. 7) to secure the horizontal positions of stanchions (126) relative to one another. Stanchions (126) terminate at socket portion (130).

In the present example, mounting portion (120) and socket portion (130) are unitary to form a single homogeneous continuum of material, though this is merely optional. In some versions mounting portion (120) is a separate piece that is mechanically or otherwise coupled to socket portion (130). Of course, still other configurations will be apparent to one of ordinary skill in the art in view of the teachings herein.

As shown best in FIGS. 2-4, socket portion (130) comprises a C-shaped member coupled to stanchions (126). In the present example, socket portion (130) has an interior surface (132) configured to receive ball member (150) therein. Socket portion (130) also includes an open section (140) that permits ball member (150) and support (12), described in greater detail below, to be side loaded into socket portion (130) by passing support (12) through open section (140), though this is merely optional. In some versions, socket portion (130) may form a continuous annular member without open section (140). In the present example, interior surface (132) comprises a conical inwardly tapered surface, as best shown in FIG. 4. The conical taper of interior surface (132) comprises a substantially constant angle of taper. As depicted in FIG. 4, the angle of taper is approximately 10 degrees relative to the vertical plane, though this is merely optional. In some versions, the angle of taper may comprise an angle of 5 degrees, inclusive, to 15 degrees, inclusive. It should be understood that the angle of taper may comprise an angle of slightly greater than 0 degrees, inclusive, to slightly less than 90 degrees, inclusive. Of course, it should be understood that interior surface (132) need not necessarily include a constant angle of taper along the entirety of interior surface (132); rather, interior surface (132) may simply include a flat portion or segment that contacts ball member (150) at a desired point or points on an outer surface (152) of ball member (150). In some versions, interior surface (132) may comprise, at least in part, a concave semi-spherical surface that is complementary to ball member (150), though this is also optional. Still other geometrical arrangements for interior surface (132) will be apparent to one of ordinary skill in the art in view of the teachings herein.

Outer surface (152) of ball member (150) contacts interior surface (132) at a latitude on ball member (150) that is at an angle below the equatorial latitude of ball member (150) equal to the angle of the taper, which is approximately 10 degrees in this example, though this is also merely optional. It should be understood that, with a constant angle of taper, the annular interface region of ball member (150) with interior surface (132) remains substantially constant even with minor size variations between ball member (150) and interior surface (132). The engagement of outer surface (152) with interior surface (132) in the present example occurs at a nearly vertical portion of each such that the surface area where the two surfaces (132, 152) engage is larger than if the engagement occurred at a lower angled region. Thus, the frictional resistance between the two surfaces (132, 152) is increased due to the mechanical advantage of the narrow angle taper in socket portion (130), which causes the contact forces between ball member (150) and socket portion (130) to be greater than the weight of the supported load. For instance, the weight of fan (10) may create a wedging action between ball member (150) and interior surface (132) to provide resistance and/or damping to rotation and/or movement of ball member (150) relative to socket portion (130). Thus, this annular interface region of outer surface (152) of ball member (150) and interior surface (132) provides frictional resistance to the rotation and/or movement of ball member (150) relative to socket portion (130). Of course, it should be understood that the foregoing is merely exemplary and, in some versions, lower angles and/or regions for engagement of the two surfaces (132, 152) may be used.

In addition, or in the alternative, interior surface (132) may include surface features that provide additional resistance to the rotation and/or movement of ball member (150). In the present example, a plurality of vertical channels (138) are disposed in an annular array about interior surface (132). Vertical channels (138) form discontinuity points about interior surface (132) such that the edges of vertical channels (138) provide additional resistance to the rotation and/or movement of ball member (150). In addition, or in the alternative, to vertical channels (138), other features may be provided on interior surface (132) as well. By way of example only, pebbling, scallops, dimples, divots, scoring, ridging, and/or other features for interior surface (132) will be apparent to one of ordinary skill in the art in view of the teachings herein. Moreover, in some versions, the material for socket portion (130) may comprise a material having a high coefficient of friction (e.g., rubber, latex, polymers, etc.) or may otherwise be selected to provide additional resistance to rotation and/or movement of ball member (150) relative to socket portion (130), though this is optional. It should be understood that the foregoing features of socket portion (130) are configured to resist slight and/or unintentional movement of ball member (150) relative to socket portion (130) while still permitting substantial intentional rotational freedom of ball member (150) relative to socket (130). For example, such features may provide resistance to, or damping of, swaying or oscillation of fan (10) caused by an imperfectly balanced fan (10) and/or features of fan (10) and/or where a slight breeze or impact moves fan (10). Of course, still other configurations for socket portion (130) and/or mount (110) will be apparent to one of ordinary skill in the art in view of the teachings herein.

As shown in FIG. 3, a tab (136) extends inwardly from interior surface (132) opposite of open section (140), though this is merely optional. In the present example, tab (136) is insertable into a channel (156) formed along a vertical portion of outer surface (152) of ball member (150), such as that shown in FIG. 4. Tab (136) of the present example is sized and vertically positioned relative to a lower surface of socket portion (130) such that tab (136) does not abut or otherwise interfere with support (12) when ball member (150) and support (12) are rotated within socket portion (130). Channel (156) of the present example comprises a groove or other indentation formed in ball member (150) that is sized to receive tab (136) therein. Channel (156) may extend vertically along outer surface (152) of ball member (150) from a top portion of ball member (150) and terminates at an intersection with vertical passage (158) such that a curved channel is formed on ball member (150). With tab (136) inserted into channel (156), tab (136) resists rotation of ball member (150) about a vertical axis extending through support (12) while permitting ball member (150) to rotate within the plane formed by channel (156). Accordingly, in some versions, when motor (22) is running for a long period of time, tab (136) and channel (156) may cooperatively resist rotation of ball member (150) and support (12) relative to mount (110). Of course, it should be understood that tab (136) and/or channel (156) may be omitted in some versions. Further configurations for tab (136) and/or channel (156) will be apparent to one of ordinary skill in the art in view of the teachings herein.

Referring back to FIGS. 2-3, ball member (150) is coupled to an end of support (12) that is opposite of fan (10). In the present example, ball member (150) comprises a polymer-based hemispherical ball having a vertical passage (158) extending through ball member (150) and configured to receive and secure support (12) therein, as will be described below. Ball member (150) is configured to interface with socket portion (130) and interior surface (132) to provide a rotatable joint. While interior surface (132) includes a number of features for providing frictional or other resistance to movement and/or rotation of ball member (150) relative to socket portion (130), in some versions ball member (150) may include one or more features to provide frictional or other resistance to movement and/or rotation of ball member (150) relative to socket portion (130) in addition or in the alternative to the features associated with interior surface (132). For instance, in some versions ball member (150) may include pebbling, scallops, dimples, divots, scoring, ridging, and/or other features on an outer surface (152) of ball member (150). In addition, or in the alternative, the material for ball member (150) and/or for a thin layer disposed on outer surface (152) may comprise a material having a relatively high coefficient of friction (e.g., rubber, latex, polymers, etc.) or may otherwise be selected to provide additional resistance to rotation and/or movement of ball member (150) relative to socket portion (130), though this is discretionary. As with the features of socket portion (130), it should be understood that the foregoing features of ball member (150) are configured to resist slight and/or unintentional movement of ball member (150) relative to socket portion (130) while still permitting substantial intentional rotational freedom of ball member (150) relative to socket (130). For example, such features may provide resistance to, or damping of, swaying or oscillation of fan (10) caused by an imperfectly balanced fan (10) and/or features of fan (10) and/or where a slight breeze or impact moves fan (10). Of course, still other features for ball member (150) will be apparent to one of ordinary skill in the art in view of the teachings herein.

In the present example, the body of ball member (150) is generally hemispherical. It should be understood, however, that the body of ball member (150) need not necessarily be shaped like exactly half of a sphere, and may instead be shaped like any portion of a sphere, or "partially" spherical. Furthermore, the body of ball member (150) may be shaped like an entire sphere. In view of this, use of terms such as "hemispherical" or "spherical" herein should not be read as being limited to exactly half of a sphere or a full sphere. A "spherical member" may in fact be shaped like just a hemisphere or some other portion of a full sphere. Similarly, a "partially spherical member" may in fact be shaped like a full sphere.

As noted above, support (12) is received in vertical passage (158) of ball member (150) such that support (12) is securely coupled to ball member (150). In the present example, support (12) includes a pair of transverse holes (196) configured to receive a pin (198) therein, as shown in FIG. 3. Ball member (150) includes a pair of transverse saddles (157) disposed on either side of vertical passage (158) such that each end of pin (198) rests within a corresponding saddle (157), as shown best in FIG. 4. Accordingly, when fan (10) is coupled to support (12), the weight of fan (10) urges pin (198) against saddles (157) to maintain pin (198) and support (12) engaged with ball member (150). In some versions, saddles (157) may include detents, clips, clamps, latches, and/or other features to retain each end of pin (198) within a corresponding saddle (157), though these are merely optional.

Figure 5:
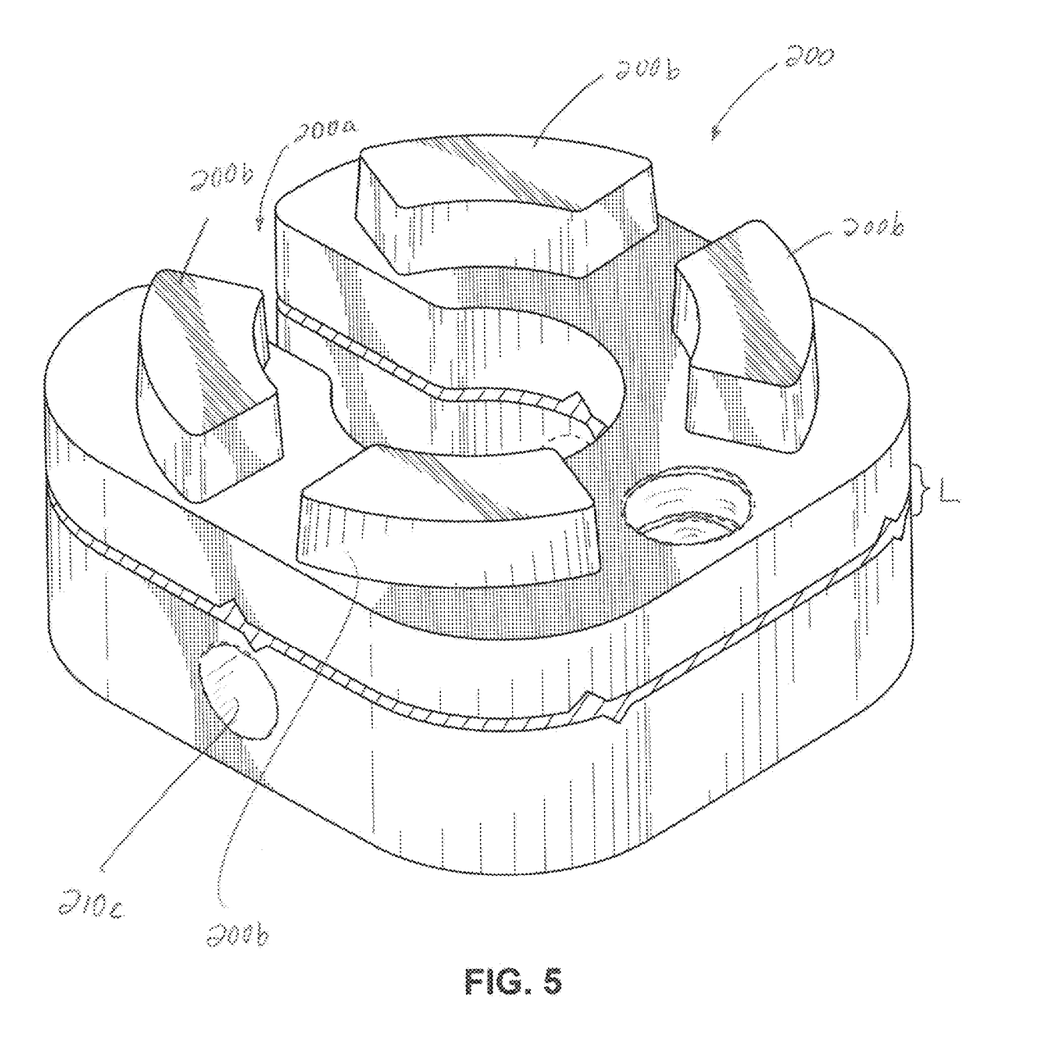
FIG. 5 depicts a bottom perspective view of the restrictor.
Figure 6:
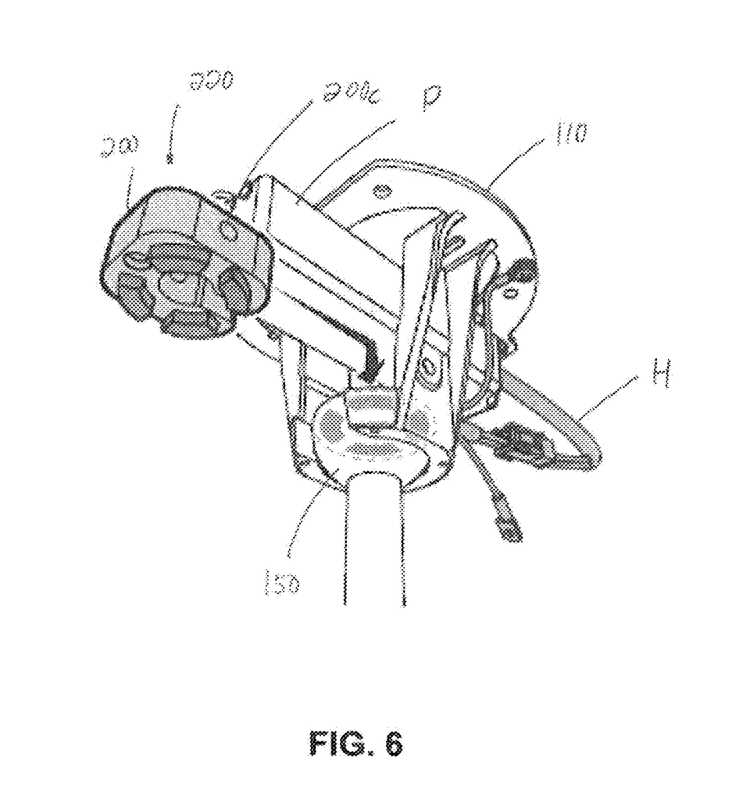
FIGS. 6 and 7 depicts the manner in which the restrictor is secured on the ball and socket mounting assembly.

To further restrict potential rotation and/or movement of the fan (10), particularly in environments in which the fan may be subject to excessive swaying that cannot be abated using the foregoing approaches, a restrictor (220) may be employed. In one embodiment, as illustrated in FIGS. 5-6, the restrictor (220) comprises a cushion (200) and a retainer, such as a bracket (210), with each element interacting with the mounting assembly (100) to dampen further the side-to-side movement or sway of the fan (10) relative to the associated mounting. The cushion (200) may be made of urethane or any other sufficiently compressible or resilient material. The cushion (210) may include a lateral side opening in the form of a slot (200a) to pass electrical cables and other wiring required for operation of the fan (10), as best demonstrated by FIG. 5. The division (L) is intended to indicate that the cushion (200) may have any height, depending on the needs of a particular application and the relative size of the bracket (210).

The bracket (210) may be adapted for insertion within a recess in the mount (110) and above the movable part of the mount, which is ball member (150) in the illustrated embodiment. The bracket (210) may be U-shaped and include a recess or cavity adapted for receiving the cushion (200) in a generally snug fitting engagement. The bracket (210) may also include feet (210a) for engaging the mounting assembly (100) (see FIG. 7).

As shown best in FIG. 6, the cushion (200) may be inserted into the socket portion (130) of the mounting assembly (100) such that it engages the ball member (150). The cushion (200) includes extensions (200b), as shown in FIG. 4, designed to engage the cavities (160) of the ball member (150). When appropriately positioned, the bottom extrusions of the cushion (200) fit inside the cavities (160), helping to secure the restrictor (220).

Figure 7:
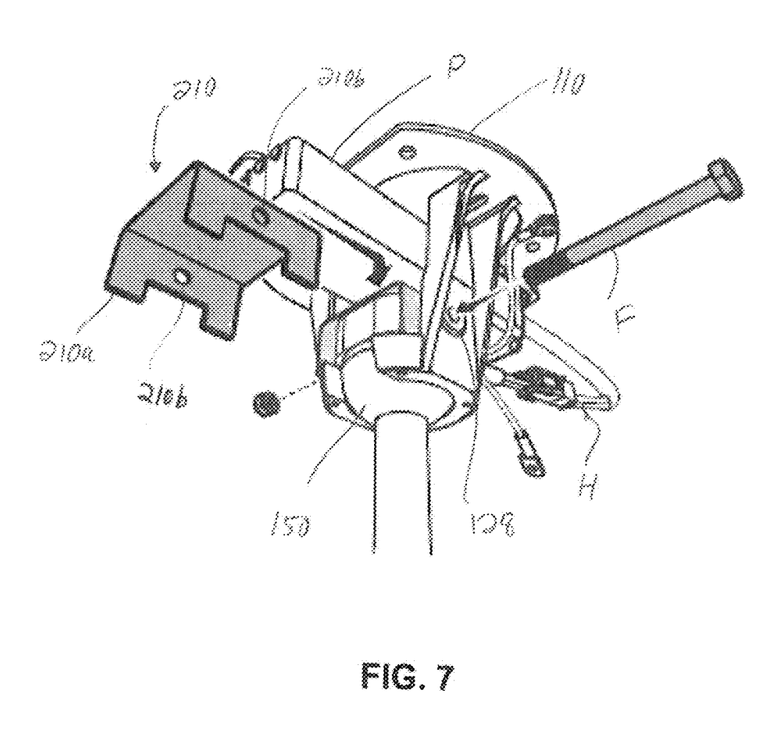

As further demonstrated by FIGS. 6-7, the cushion (200) may be inserted within the mounting assembly (100), and mount (110) in particular, such as below an associated power source (P) for powering the fan (10) (note wiring harness (H)). The bracket (210) may then pass over the cushion (200) and positioned such that holes (210b) in the bracket (210) align with a corresponding passage (200c) in the cushion (200), and also with the lateral openings (128) of the socket portion (130). A fastener (F), such as a bolt, pin, or other cross member, may be inserted through the aligned openings (128) and passage/holes (200c, 210b) to secure the position of the bracket (210) and cushion (200) relative to the mount assembly (100) (and, in particular, to the mount (110)). When the bracket (210) is secured within the socket portion (130) of the mounting assembly (100), it may be substantially flush with the upper surface of the cushion (200) so that a continuous engagement is established. Additionally, the bracket (210) may drop into place such that all four feet (210a) of the bracket (210) are coincident with the socket portion (130).

Figure 8:
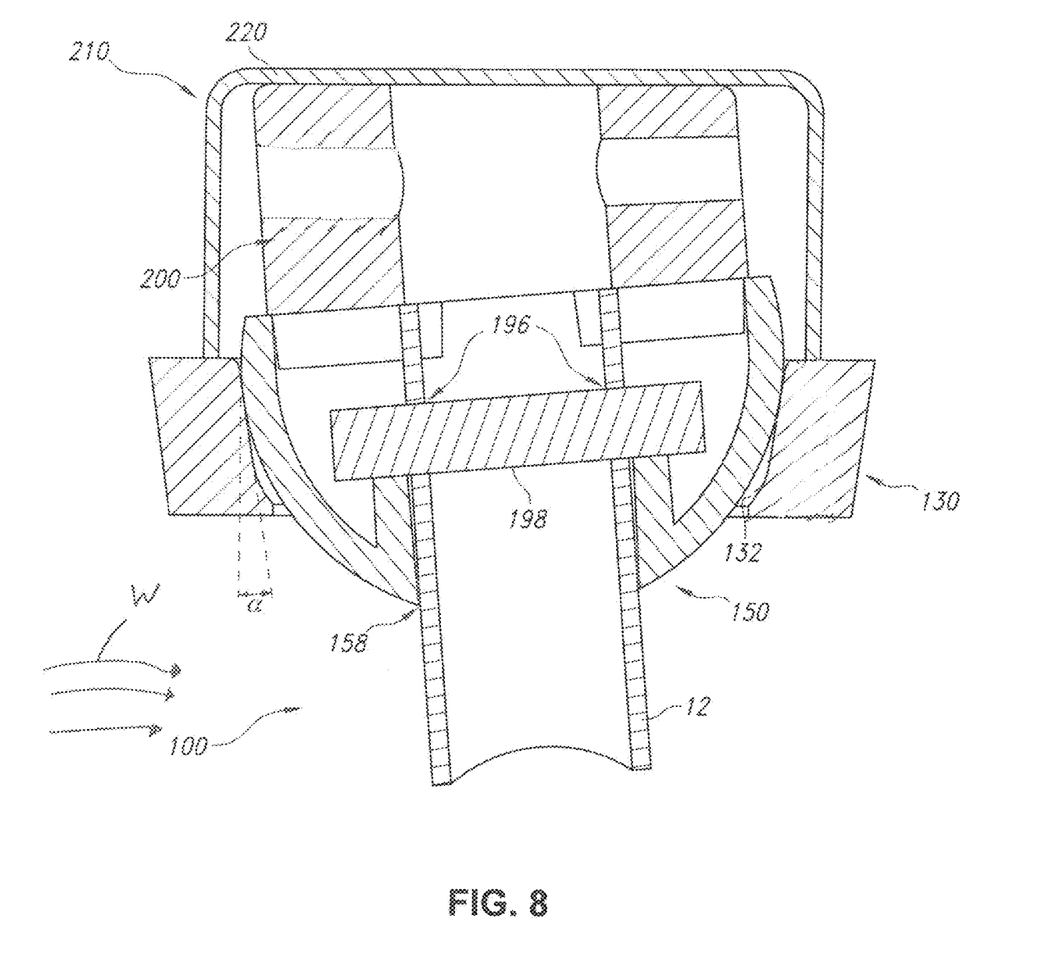
FIG. 8 depicts the cushioning effect provided when the fan is subject to forces that would ordinarily cause an unacceptable level of sway based on frictional engagement between the ball and socket alone.

In use, the fan (10) may be subject to swaying as a consequence of external forces, such as wind (note action arrows W in FIG. 8), to a degree that cannot be foreclosed by the frictional engagement of the ball (150) with the socket portion (130). In such case, the relative movement of the ball (150) causes the cushion (200) to compress within the mounting assembly (100) as a result of the engagement with the fixed bracket (210) and the connection thereto established by fastener (F). As can be appreciated, this serves to minimize any sway of the fan (10), as best demonstrated in FIG. 8 (note small angle $\alpha$, which may be as less than 5 degrees, and possibly only 1-2 degrees, depending on the material properties of the cushion (200), which may be influenced by ambient temperature to create some variability). The cushion (200) thus provides a counteracting force which limits the degree to which the fan (10) may oscillate or sway.

As can be appreciated, the size and shape of the bracket (210) and cushion (200) is especially well adapted for being retrofitted into existing fan mounts comprising ball and socket types of arrangements. An installer may simply insert the bracket (210) and cushion (200) in the manner described, and the desired anti-sway capabilities may be achieved. Furthermore, should the cushion (200) deteriorate over time, it can be easily replaced. Likewise, if a particular cushion (200) is deemed inadequate to reduce the sway to an acceptable level, a cushion formed of a less resilient or harder material may be used as a replacement.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not necessarily required. Accordingly, the scope of the present invention should be considered in terms of the claims and is understood not to be limited to the details of structure and operation shown and described in the specification and drawings.

The invention claimed is:

1. An apparatus for mounting a fan, comprising:
a fan mount for supporting the fan, the fan mount comprising a first part movable relative to a second part; and
a restrictor connected to the second part of the fan mount above the first part, wherein the restrictor restricts movement of the fan relative to the fan mount.

2. The apparatus of claim 1, wherein the first part comprises a partially spherical ball and the second part comprises a socket for at least partially receiving the partially spherical ball, the restrictor positioned in the fan mount for engaging an upper surface of the partially spherical ball.

3. The apparatus of claim 2, wherein the restrictor includes at least one projection for extending into a cavity within the partially spherical ball.

4. The apparatus of claim 1, wherein the restrictor comprises a compressible material.

5. The apparatus of claim 1, wherein the restrictor includes a passage for receiving a fastener for connecting the restrictor to the second part of the fan mount.

6. The apparatus of claim 1, further including a power source, and wherein the restrictor includes an opening for receiving wires from the power source.

7. The apparatus of claim 1, further including a bracket for securing the restrictor to the fan mount.

8. The apparatus of claim 7, wherein the bracket is U-shaped and the restrictor is adapted to fit within a cavity of the bracket.

9. The apparatus of claim 7, wherein the bracket includes a passage for receiving a fastener for connecting the bracket to the fan mount.

10. An apparatus for mounting a fan, comprising:
a fan mount for supporting the fan, the fan mount comprising a socket for receiving an at least partially spherical ball; and
a cushion connected to the fan mount for dampening motion of the partially spherical ball relative to the socket.

11. The apparatus of claim 10, wherein the cushion is mounted above and separate from the partially spherical ball.

12. The apparatus of claim 10, further including a bracket connected to the fan mount for at least partially receiving the cushion.

13. The apparatus of claim 12, further including a fastener for connecting the bracket to the mounting assembly.

14. The apparatus of claim 13, wherein the fastener extends through a passage in the cushion.

15. A method of controlling sway of a fan relative to a fan mount comprising a first part connected to a support for supporting the fan, the first part being movable relative to a second part, comprising:
cushioning movement of the first part relative to a third part connected to the second part.

16. The method of claim 15, wherein the cushioning step comprises connecting a cushion to the second part for engaging the first part.

17. The method of claim 16, further including the step of passing a fastener through the fan mount and the cushion.

* * * * *